Feb. 22, 1966 J. FAISANDIER 3,236,571
FRICTION SURFACES
Filed June 15, 1962 2 Sheets-Sheet 1
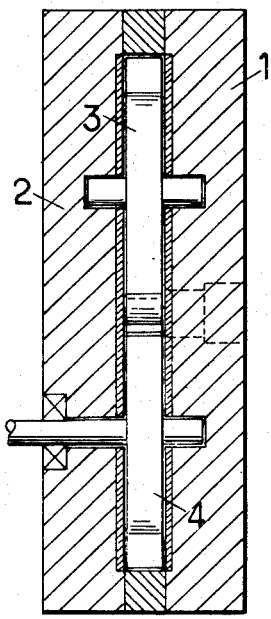
FIG. I
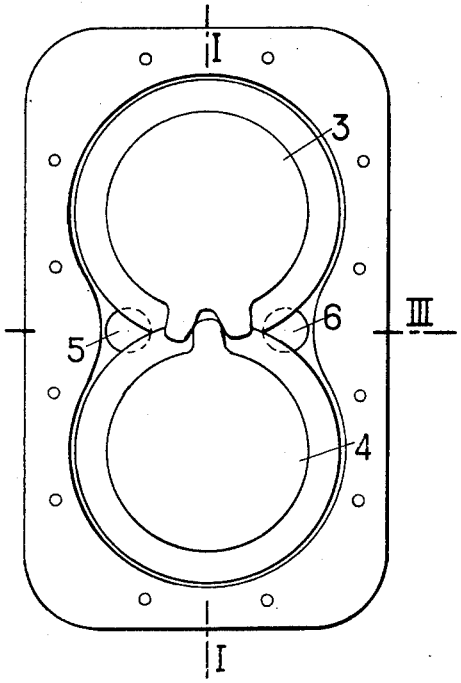
FIG. II
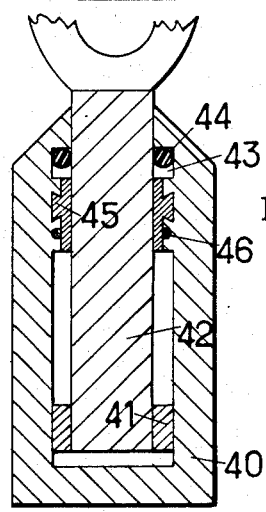
FIG. VIII
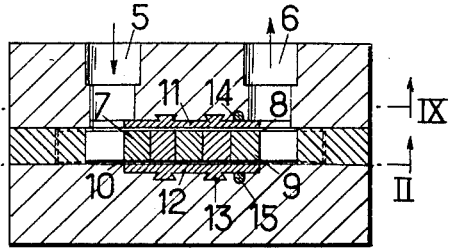
FIG. III

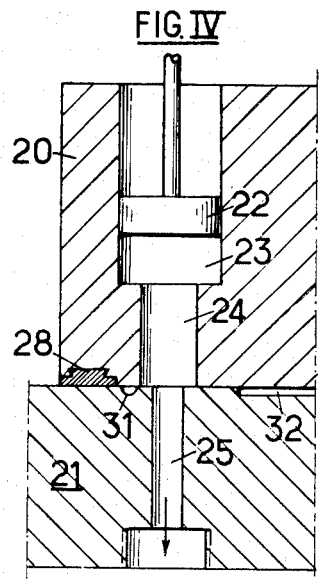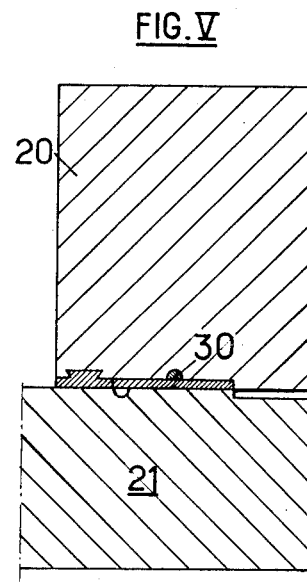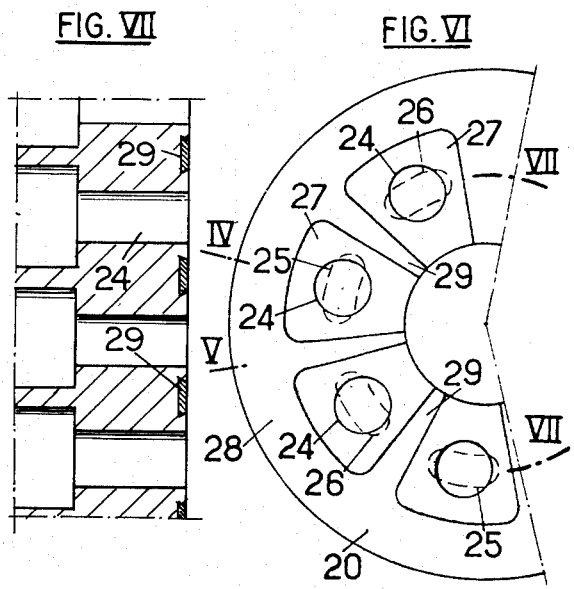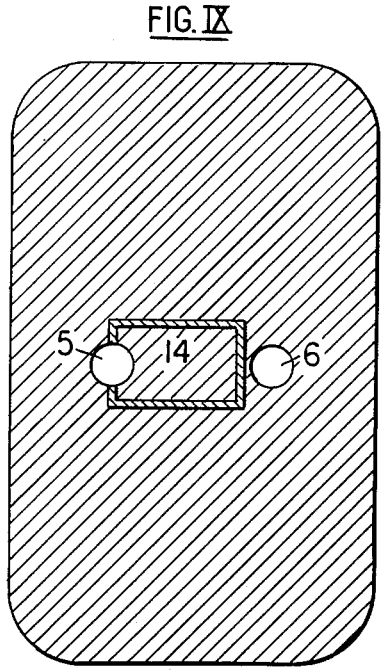

United States Patent Office 3,236,571
Patented Feb. 22, 1966

3,236,571
FRICTION SURFACES
Jacques Faisandier, 32 Blvd. Felix Faure,
Chatillon-sous-Bagneux, France
Filed June 15, 1962, Ser. No. 202,798
Claims priority, application France, June 16, 1961,
865,299
4 Claims. (Cl. 308—122)

This invention relates to hydraulic apparatus comprising parts adapted to move relative to each other, the parts having confronting slide surfaces through which hydraulic fluid under pressure is conducted from one of the parts to the other of the parts. If the hydraulic apparatus is made with a tight fitting of the parts moving relative to each other the clearance between the moving parts has to be extremely small, with the result that abnormal wear of these surfaces tends to take place; the object of the invention is to make it possible to use the material having the best coefficient of friction, for instance the anti-friction material, under conditions in which the use of this material has previously appeared to be inadvisable, for instance because of the nature of the mechanical or hydraulic forces applied or because of the way in which these forces are applied.

The invention, although it may be used in other ways, is intended more particularly to permit the use of anti-friction metal, or metal of the same type, in a case in which considerable forces are exerted perpendicularly to a plane in which the friction is exerted, which forces would normally lead to crushing of the anti-friction metal which does not have any considerable mechanical strength, and also in a case in which the surface may be subjected edgewise, to forces of which the value varies within wide limits so that there is a danger that an anti-friction layer may become detached even though this layer is secured by dovetail attachment means in a manner known per se.

The invention will be better understood from the following description of embodiments chosen by way of example and illustrated in the accompanying drawings.

In FIGURES 1 to 3 of these drawings, which relate to the use of the invention in gear pumps, FIGURE 1 is a diagrammatic section through an ordinary gear pump, on a plane passing through the axes of the gears, FIGURE 2 is a diagrammatic section on a central plane perpendicular to the plane of FIGURE 1, and FIGURE 3 is a section, on line III—III of FIGURE 2, of a pump as shown in FIGURES 1 and 2 in which the present invention is used.

In FIGURES 4 to 7, which relate to a barrel pump,

FIGURE 4 is a section through part of the pump, on line IV of FIGURE 6,

FIGURE 5 is a section through part of the pump, on line V of FIGURE 6,

FIGURE 6 is a view of the barrel, from below, and

FIGURE 7 is a developed cylindrical section, on line VII—VII of FIGURE 6.

FIGURE 8 represents an axial section through a jack in which the invention is used.

FIGURE 9 is a section view taken along IX—IX in FIGURE 3.

In the case of gear pumps, as diagrammatically illustrated in FIGURES 1 and 2, it is known that the internal surfaces of the casings 1 and 2, opposite the gears 3 and 4, are subjected on the one hand to the friction of the sides of these gears and on the other hand to the internal pressure which may be considerable on the outlet side.

At the present time, the most common way of dealing with this consists in placing facings or cheeks on the hard metal of the internal surfaces of the casings; these facings consist generally of bronze but in all cases of a metal that is less soft than the anti-friction metal, so as to be able to withstand the effects of the hydraulic pressure, but does not have the friction-reducing properties of the anti-friction metal.

This construction is relatively costly because it calls for a relatively large quantity of bronze.

In accordance with the present invention, a layer of anti-friction metal is cast on each inner wall, at least in the region opposite the gears, in a cavity machined for this purpose and provided with the usual dovetail recesses to hold the cast layer in place.

But a construction of this kind makes it necessary to provide means for eliminating the pressure gradient in the space between the confronting slide surfaces of the moving parts in the vicinity of the outlet, in order to avoid excessive deformation. Now, the usual method of using relief grooves machined in the wall fails in this case, because when the anti-friction metal is cast these grooves or channels, which have to be machined beforehand, would be blocked by the metal.

In accordance with the invention, however, grooves of this kind are used, but these grooves are filled with a material which will relieve the pressure in the fluid by permitting flow of the fluid to a point where the pressure is atmospheric or sub-atmospheric, for instance to the inlet.

In practice, a cord of porous structure or porous material, for example a cord of asbestos, will be placed in each groove.

FIGURE 3 shows the use of the invention in the pump diagrammatically illustrated in FIGURES 1 and 2.

In FIGURE 3, 5 is the inlet and 6 is the outlet.

The rectangle 7–8–9–10 represents the space swept by the gears in the plane of the section.

In accordance with the invention, two layers of anti-friction metal 11 and 12, shown in section in the drawing, extend over the whole of the region located opposite the sides of the two gears 3 and 4. To hold these layers in place, dovetail recesses such as 13, of the usual kind, are provided, and lastly, in accordance with the invention relief grooves 14 and 15 are provided behind the layers 11 and 12; these grooves communicate with the inlet 5 through channels not shown in the drawing.

Before the anti-friction metal is cast, a cord of asbestos is placed inside each of these two grooves. For this reason, the grooves are hatched in the drawing.

Practical experience has shown that this arrangement permits sufficient drainage to ensure that the pressure gradient between these grooves and the inlet will be zero.

The preceding description and the drawing show that the quantity of anti-friction material needed is very small.

It can also be seen that the invention makes it possible to combine friction surfaces and sealing surfaces in one and the same plane, and that one of the characteristics of the invention can be said to be the separation of these functions and their distribution to different surfaces each appropriate to the duty which it has to perform, whereas for instance bronze represented a compromise between different requirements.

This inventive idea may be used in the case of rotary piston pumps, in which it is possible to separate the bearing or sealing surfaces, the friction surfaces and the distribution surfaces.

FIGURES 4 to 7 diagrammatically illustrate a rotary piston pump of the type known as a barrel pump; these drawings show only the parts necessary to enable the invention to be understood, that is to say, barrel 20 rotating about a vertical axis, and a fixed distributor 21. The diagrammatic drawings may also apply to rotary piston pumps of the type known as star pumps; in this last case, the surface of contact between the distributor and the body containing the pistons would not be flat but would have a cylindrical shape, the axis of the cylinder being perpendicular to the plane of the drawing and the body rotating about this same axis.

The barrel 20 contains a certain number of pistons such as 22 which are distributed as regular intervals about the axis of the body. The cylinder 23, which is the only cylinder shown in the drawing, communicates with the contact surface through a channel 24. The mouth of the channel, which is circular, passes alternately in front of orifices 25 communicating with the outlet and orifices 26 communicating with the inlet; the orifices 25 and 26 are of elongated shape as shown in broken lines in FIGURE 6. The movement of the pistons is controlled by an inclined surface, as is known.

Surfaces 27, serving both as distribution surfaces and also as bearing surfaces, are left round the mouths of the channels 24. An anti-friction layer occupies an annular space 28 and spaces 29 between each two adjacent distribution zones. One or more relief grooves, one of which is shown at 30, are provided behind the anti-friction layer; in accordance with the invention a cord of asbestos is disposed in each relief groove. The distributor is also provided with relief grooves such as 31 and 32, and all of these grooves 30, 31 and 32 communicate with the inlet through channels which are formed in the distributor but which are not shown in the drawings.

It is of course possible to place the anti-friction layer in the distributor, or to have two such layers, one in the barrel and one in the distributor.

In this case also, one and the same plane contains on the one hand friction surfaces and on the other hand supporting and distribution surfaces, and the separation of functions is obtained.

The third embodiment of the invention, illustrated in FIGURE 8, concerns a jack of which 40 is the cylinder and 41 is the plunger with a rod 42. At the top, the wall of the cylinder is provided with a circular groove with the usual seal 44.

45 is a layer of anti-friction material; a relief groove 46 may be provided and, in accordance with the invention, will contain a cord of asbestos and will communicate with the pressure medium reservoir through a channel not shown in the drawing. In order to simplify the drawing the distribution ducts have been omitted, since they do not concern the present invention.

As shown in the drawing, in this case also there is clearly a separation of functions, since the anti-friction material forms the friction surface and sealing is performed by the seal 44.

I claim:
1. Hydraulic apparatus comprising a first member, a second member having a sliding surface including two spaced areas subjected to a difference in hydraulic pressure having an area of low pressure and an area of high pressure, a metallic, anti-friction material rigidly secured to said first member, said anti-friction material having a surface in sliding engagement with the sliding surface of said second member, and at least one relief groove between said first member and said anti-friction material adjacent said area of high pressure and communicating with said area of low pressure whereby a relief of pressure is provided between said areas of high and low pressure preventing said anti-friction material from becoming detached from said first member.

2. Hydraulic apparatus as defined in claim 1 wherein said relief groove is filled with a material which is permeable to liquid.

3. Hydraulic apparatus as defined in claim 2 wherein said material is asbestos.

4. Hydraulic apparatus as defined in claim 1 wherein said groove is located in said first member.

References Cited by the Examiner

UNITED STATES PATENTS

| | | | |
|---|---|---|---|
| 1,570,033 | 1/1926 | Banner | 308—56 |
| 1,900,593 | 3/1933 | Wade | 308—122 |
| 1,927,395 | 9/1933 | Edwards | 103—126 |
| 1,972,632 | 9/1934 | Patton | 103—126 |
| 1,977,335 | 10/1934 | Brophy et al. | 308—237 |
| 2,202,912 | 6/1940 | Johnson | 103—126 |
| 2,202,913 | 6/1940 | Johnson | 103—126 |
| 2,405,061 | 7/1946 | Shaw | 103—126 |

FOREIGN PATENTS

| | | |
|---|---|---|
| 320,314 | 10/1929 | Great Britain. |
| 537,428 | 6/1941 | Great Britain. |

DON A. WAITE, *Primary Examiner.*

FRANK SUSKO, WILBUR J. GOODLIN, ROBERT C. RIORDON, *Examiners.*